United States Patent
Elliott et al.

(10) Patent No.: US 6,785,071 B2
(45) Date of Patent: Aug. 31, 2004

(54) DISK DRIVE WRITER WAVEFORM INDUCED PRECOMPENSATION

(75) Inventors: Carl F. Elliott, Eden Prairie, MN (US); John D. Leighton, Anoka, MN (US)

(73) Assignee: Agere Systems Inc., Allentown, PA (US)

( * ) Notice: Subject to any disclaimer, the term of this patent is extended or adjusted under 35 U.S.C. 154(b) by 17 days.

(21) Appl. No.: 10/115,303

(22) Filed: Apr. 3, 2002

(65) Prior Publication Data

US 2003/0189778 A1 Oct. 9, 2003

(51) Int. Cl.[7] .............................. G11B 5/02; G11B 5/09
(52) U.S. Cl. .............................. 360/29; 360/46; 360/66
(58) Field of Search .............................. 360/29, 46, 25, 360/66

(56) References Cited

U.S. PATENT DOCUMENTS

| | | | | | |
|---|---|---|---|---|---|
| 4,547,817 | A | * | 10/1985 | Klaassen | 360/29 |
| 6,175,456 | B1 | * | 1/2001 | Yun | 360/46 |
| 6,198,583 | B1 | * | 3/2001 | Ohinata et al. | 360/46 |
| 6,212,024 | B1 | * | 4/2001 | Igarashi et al. | 360/51 |
| 6,493,161 | B1 | * | 12/2002 | Elliott et al. | 360/46 |
| 6,594,095 | B1 | * | 7/2003 | Yamagishi et al. | 360/46 |

* cited by examiner

*Primary Examiner*—David Hudspeth
*Assistant Examiner*—Varsha A. Kapadia
(74) *Attorney, Agent, or Firm*—Kinney & Lange, P.A.

(57) ABSTRACT

A disk driver writer precompensation system modulates the write current waveform based on a pattern of data bits magnetically recorded on a medium in order to adjust the timing of magnetic transitions recorded on the medium.

21 Claims, 8 Drawing Sheets

DISK DRIVE WRITER WAVEFORM INDUCED PRECOMPENSATION

BACKGROUND OF THE INVENTION

The present invention relates to precompensation of magnetic transitions written to a medium such as a disk, and more particularly to an apparatus and method for adjusting the shape of the write current waveform generated by the write driver to compensate for timing irregularities occurring in a high data rate magnetic recording system.

In magnetic data recording systems such as disk drives, data are recorded on the medium (i.e., magnetic disk) as a series of magnetic field transitions. In many typical systems, a magnetic transition which occurs at or near an integer multiple of the bit cell time represents a binary "1," while the lack of a magnetic transition at that same time represents a binary "0." A magnetic field is typically created by passing a current through a write head adjacent to the medium, creating a "write bubble" which defines a region in which the magnetic field is sufficiently strong to be magnetically recorded on the medium. Magnetic transitions are created by reversing the direction of current flowing through the write head.

The process of reversing the direction of current flowing through the write head requires a finite amount of time, often referred to as the "rise time" of the write driver employed by the head. The "write bubble" created by the head field correspondingly contracts as the current is reduced to zero and expands as the current in the opposite direction increases to its steady-state value. The time required for the write bubble to expand to near its steady-state dimensions is referred to as the "flux rise time" of the head.

In high performance disk drive systems, the data recording rate can be high enough that the write bubble is unable to fully expand to its steady-state dimensions when the data to be recorded requires two or more consecutive magnetic transitions. The premature collapse of the write bubble (compared to other write bubbles which are allowed to develop fully) results in displacement of the location of the magnetic transition (which is defined by the location of the trailing edge of the write bubble when the write bubble expansion velocity is equal to the linear velocity of the media) from the ideal location of the transition edge by some non-linear amount. This phenomenon is known as a finite rise time "non-linear transition shift" (NLTS) in the magnetic transition pattern. A NLTS in the magnetic transition pattern of a disk drive system may also be caused by interactions between the magnetic field forming the present transition and the demagnetization fields of previous transitions and by timing shifts resulting from write current directions changes that begin from different relative positions on the settling portion of the write current waveform from a previous transition. These transition shifts can potentially cause errors in reading data from the disk, effectively limiting the data recording rate of the disk drive to a level at which the magnitude and frequency of occurrence of transition shifts are sufficiently low to ensure accurate data recovery from the disk.

In the prior art, transition shifts have been accounted for by a process known as precompensation. Precompensation systems examine a pattern of data bits to determine whether the pattern causes a NLTS to occur, and adjust the timing of magnetic transitions to compensate for the transition shifts. Precompensation may be accomplished by examining previous data bit patterns, known as "look behind" precompensation, or by examining future data bit patterns to be recorded, known as "look ahead" precompensation and described in detail in U.S. application Ser. No. 09/845,365 filed Apr. 30, 2001 for "Look Ahead Write Precompensation" by C. Elliott, J. Leighton, D. Galaba, T. Adams and S. Doherty.

Precompensation systems such as those described above typically employ programmable delays to adjust the timing of recorded magnetic transitions. However, the use of delays to adjust transition timing reduces the time between transitions, by as much as 25% in some embodiments. The reduction in bit cell time forces the write driver to achieve steady state in a shorter amount of time, which places a heavy strain on the write driver. It would be an improvement in the art to provide a precompensation system for adjusting the timing of magnetic transitions without employing delays, such as by modifying the write current waveform in a controlled manner. Such a system is the subject of the present invention.

BRIEF SUMMARY OF THE INVENTION

The present invention is a disk drive writer precompensation system that modulates the write current waveform based on a pattern of data bits magnetically recorded on a medium in order to adjust the timing of magnetic transitions recorded on the medium.

DETAILED DESCRIPTION

Figure 1:
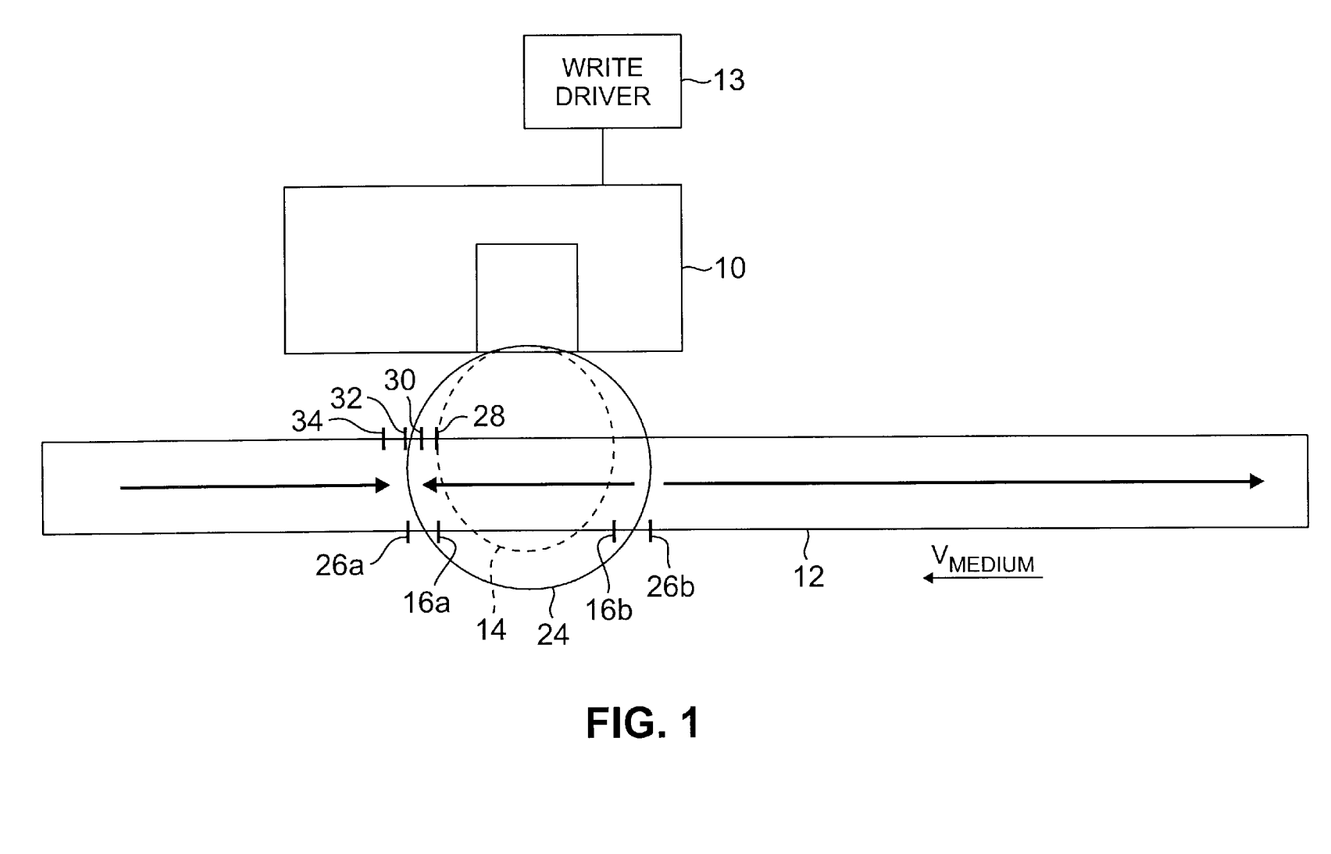
FIG. 1 is a diagram illustrating the write bubble created by a write head to magnetically record information on a medium.

FIG. 1 is a diagram illustrating the "write bubble" created by write head 10 to magnetically record information on disk 12. Write head 10 is configured in a manner well known in the art, and is operable with appropriate write driver circuitry 13 to generate magnetic fields of first and second opposite polarities in response to binary data signals for recording onto disk 12. A data encoding scheme well known in the art is the Non-Return-to-Zero Inverted (NRZI) encoding scheme, in which a magnetic transition recorded on the disk signifies a binary "one" and the lack of a magnetic transition recorded on the disk signifies a binary "zero."

The magnetic field generated by write head 10 takes the shape of a "write bubble," which is defined as the region in which the magnetic field generated by write head 10 is strong enough to magnetically record on disk 12. There is a finite "flux rise time" associated with write head 10, which is the time in which the write bubble expands in response to a command from write driver 13 to record a magnetic transition on disk 12. FIG. 1 illustrates write bubble 14 (in dashed lines) at a first time while it is expanding, extending to lateral edges 16a and 16b on disk 12, and also shows write bubble 24 at a second time later than the first time, extending to lateral edges 26a and 26b on disk 12. A given point on disk 12 moves past write head 10 in a direction and at a velocity indicated by the arrow labeled Vmedium. The arrows shown on disk 12 indicate the direction of magnetization of the disk, as recorded by the magnetic field generated by write head 10.

The velocity at which the write bubble expands (Vwb) gradually decreases as the size of the write bubble increases. The location of a magnetic transition on disk 12 is defined by the trailing edge of the write bubble at the time that the expansion velocity of the write bubble (Vwb) is equal to the velocity of the disk (Vmedium). This principle is best explained by examining three scenarios: (1) Vwb>Vmedium, (2) Vwb=Vmedium, and (3) Vwb<Vmedium. For each scenario, the movement of a point on disk 12 will be examined between the first time (write bubble 14) and the second time (expansion to write bubble 24). At the first time, the point is located at position 28, aligned with lateral edge 16a of write bubble 14. The point therefore defines the furthest point which has been written with a transition at the first time. As the write bubble expands to write bubble 24 at the second time, the point moves to the left in FIG. 1.

Where Vwb>Vmedium, the point moves only to position 30 at the second time (when the write bubble expands to write bubble 24). Since write bubble 24 extends to lateral edge 26a, which is further out than position 30, the write bubble defines a new transition location at lateral edge 26a. The transition location is therefore continually redefined as long as Vwb>Vmedium.

Where Vwb=Vmedium, the point moves to position 32 at the second time (when the write bubble expands to write bubble 24). Position 32 is aligned with lateral edge 26a of write bubble 24. The point represents the transition location (lateral edge of the write bubble) defined both at the first time and at the second time. The transition location is therefore defined when Vwb=Vmedium.

Where Vwb<Vmedium, the point moves to position 34 at the second time (when the write bubble expands to write bubble 24). Position 34 is further out than lateral edge 26a of write bubble, and its magnetization is not changed by the magnetic field of the head since it is not located within write bubble 24. The transition location is therefore unaffected when Vwb<Vmedium.

Figure 2:
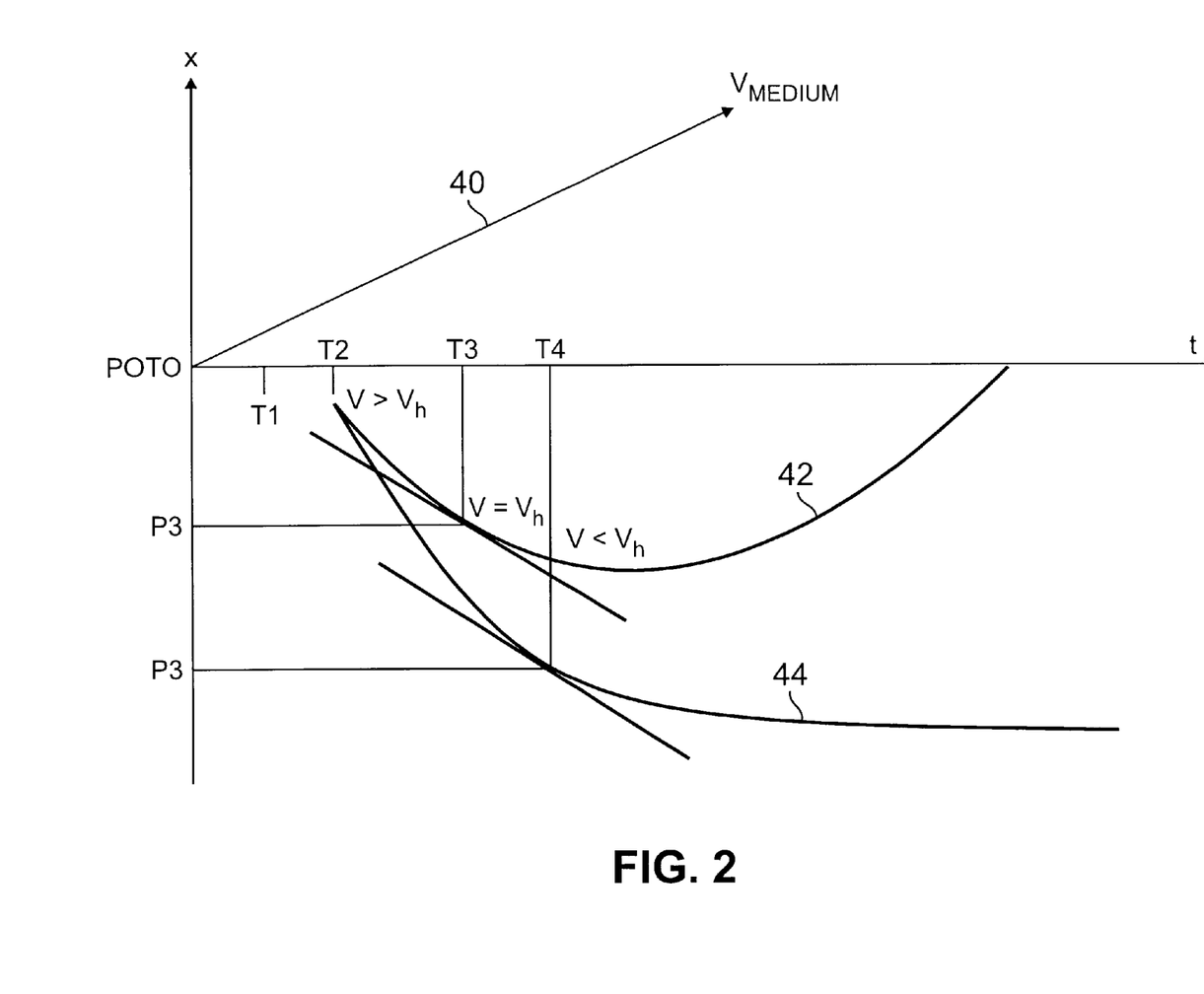
FIG. 2 is a graph illustrating the effect on the location of a magnetic transition caused by changing the expansion velocity of the write bubble so that premature collapses of the write bubble occur when consecutive transitions are written.

FIG. 2 is a graph illustrating the effect that changing the expansion velocity of the write bubble has on the location of a magnetic transition. The horizontal axis of the graph represents time and the vertical axis of the graph represents the position of a point on the disk. Line 40 represents the movement of the write head with respect to the disk at a constant velocity (Vmedium). Curve 42 represents the expansion of the write bubble in response to a first write current waveform generated by the write driver, and curve 44 represents the expansion of the write bubble in response to a second write current waveform generated by the write driver. Time T0 is the time when the write current begins to switch directions through the write head. Time T1 is the time when the write current reaches zero. Time T2 is the time when the write bubble first begins to form on the disk.

As shown in FIG. 2, the instantaneous velocity of expansion of the write bubble (the slope of curves 42 and 44) is equal to Vmedium at time T3, point P3 for curve 42, and at time T4, point P4 for curve 44. As explained above with respect to FIG. 1, the location of a magnetic transition on the disk is defined by the point where the velocity of expansion of the write bubble is equal to Vmedium. Therefore, the write bubble expansion profile of curve 42 results in a magnetic transition located at point P3 and write bubble expansion profile of curve 44 results in a magnetic transition located at point P4. It can therefore be appreciated that changing the write bubble expansion profile, which can be achieved by modifying the write current waveform generated by the write driver, can selectively control the location of a magnetic transition recorded on the disk.

There are several ways to dynamically and selectively modify the write current waveform. Some of these methods include modulating the shape of the write current waveform in the predriver circuitry, modulating the overshoot drivetime of the write circuit, and modulating the voltage available to the write head cell. Any of these or other methods may be used to effectively implement write current waveform modulation to precompensate for magnetic transition timing variations according to the present invention. For the purpose of complete disclosure, an exemplary embodiment allowing for modulation of the voltage available to the write head cell will be described in detail below.

Figure 3:
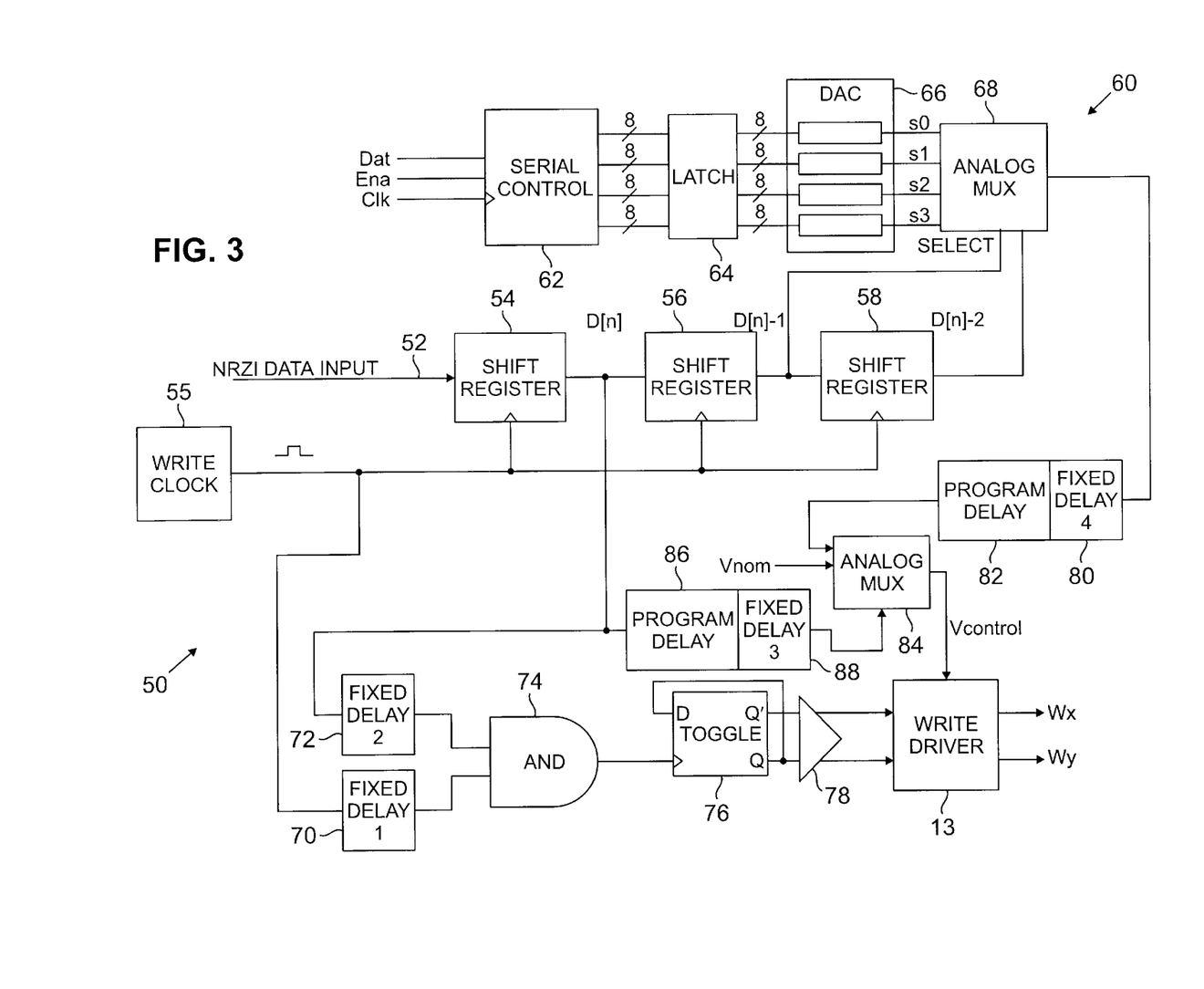
FIG. 3 is a block diagram illustrating a write control circuit for selectively modulating the voltage available to a write head cell in a precompensation system according to an exemplary embodiment of the present invention.

FIG. 3 is a block diagram illustrating write control circuit 50 for selectively modulating the voltage available to a write head cell in a precompensation system according to an exemplary embodiment of the present invention. An NRZI data input stream is received by write control circuit 50 on line 52, which is input to shift register element 54. The NRZI data stream is a series of binary ones and zeroes at high and low logic levels, respectively, as is generally known in the art. Shift register element 54 is clocked by write clock 55, and is configured to shift the data input stream by zero clock cycles. The output of shift register element 54 therefore has a current state that corresponds to the data bit to be immediately recorded, and can be represented as D[n]. The output of shift register 54 is input to shift register element 56, which is clocked by write clock 55 and is configured to shift the data input stream by one clock cycle in the negative (earlier in time) direction. The output of shift register element 36 therefore has a current state that corresponds to the data bit recorded one clock cycle earlier, and can be represented as D[n−1]. The output of shift register element 56 is input to shift register element 58, which is clocked by write clock 55 and is configured to shift the data input stream by one additional clock cycle in the negative (earlier in time) direction. The output of shift register element 58 therefore has a current state that corresponds to the data bit recorded two clock cycles earlier, and can be represented as D[n−2]. Shift register elements 54, 56 and 58 thus make up a three bit shift register.

In an exemplary embodiment, voltage control portion 60 of write control circuit 50 includes serial control circuit 62 having a data input (Dat), an enable input (Ena) and a clock input (Clk). Serial control circuit 62 outputs four individual 8-bit signals through latch 64 to control digital-to-analog converters (DACs) 66. The number of DACs 66 is determined by the number of precompensation variables provided by the system. For example, the exemplary embodiment shown in FIG. 3 provides four possible voltages to the write driver, requiring four DACs 66 providing outputs s0, s1, s2 and s3. The outputs of DACs 66 are input to analog multiplexer 68, which is controlled by the outputs of shift register elements 56 and 58 to select a voltage output based on the state of data bits D[n−1] and D[n−2].

Write clock 55 is input to fixed delay circuit 70, and the D[n] output of shift register element 54 is input to fixed delay circuit 72. The outputs of fixed delay circuits 70 and 72 are input to AND gate 74, which has an output connected to the clock input of flip-flop 76. Flip-flop 76 is a toggle, D-type flip-flop having its Q output connected to its D input, with its Q output and its Q' output connected to output stage 78. The differential signal provided by output stage 78 to write driver 13 is therefore in an appropriate form, such as positive emitter coupled logic (PECL), for controlling write driver 13 to operate the write head to selectively record magnetic transitions on the disk.

The voltage available to write driver 13 is controlled in order to adjust the timing of magnetic transitions recorded on the disk. The output of analog multiplexer 68 is routed through fixed delay 80 and programmed delay 82 to analog multiplexer 84. A nominal voltage ($V_{nom}$) is also input to analog multiplexer 84. The D[n] output of shift register element 54 is routed through programmed delay 86 and fixed delay 88 to control analog multiplexer 84, so that the nominal voltage is selected when the current data bit (D[n]) is not a transition, while the voltage provided by analog multiplexer 68 is selected when the current data bit (D[n]) is a transition. The output of analog multiplexer 84 is provided as a control voltage $V_{control}$ to write driver 13, which modifies the rail voltage available to the current switch circuit of write driver 13. In the exemplary embodiment shown in FIG. 3, $V_{control}$ is inversely proportional to the voltage available to write driver 13, although one skilled in the art will recognize that any relationship between a control parameter and the voltage available can be utilized to modulate the voltage available. The selective modulation of the voltage available to write driver 13 affects the timing of the magnetic transition recorded on the disk in a controlled manner.

Although the example shown in FIG. 3 selects a control voltage (and consequently a voltage available to the write driver) based only on the state of data bits previously recorded, it should be understood by those skilled in the art that the selection may also take into account the state of data bits to be subsequently recorded by expanding and/or adjusting the shift register and practicing the teachings of the aforementioned U.S. application Ser. No. 09/845,365, which is hereby incorporated by reference.

Figure 4:
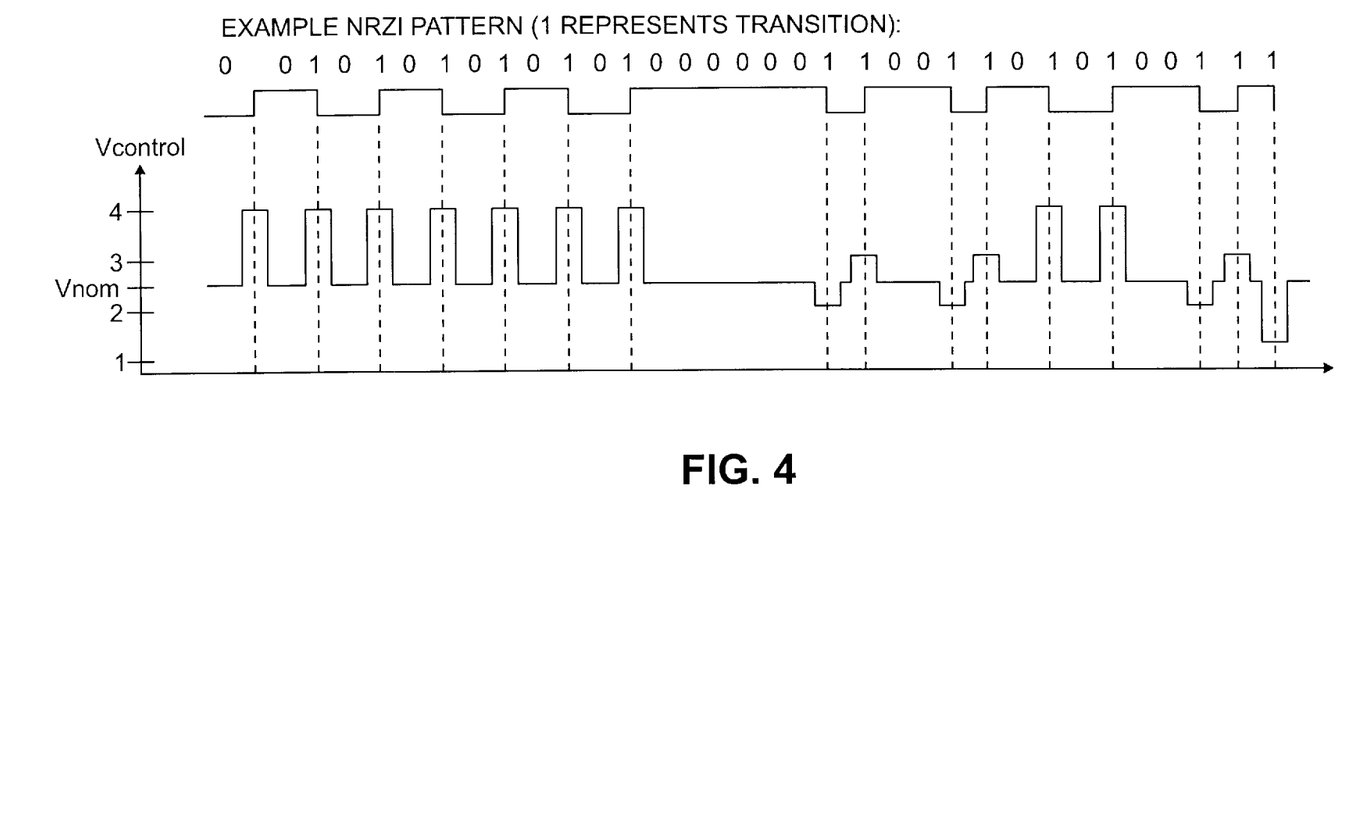
FIG. 4 is a graph illustrating an exemplary NRZI data pattern and the values of the control voltage available to the write driver that may be selected to modulate the write current waveform to compensate for transition non-linearities.

FIG. 4 is a graph illustrating an exemplary NRZI data pattern (with a 1 representing a transition) and the values of the control voltage ($V_{control}$) available to the write driver that may be selected to modulate the write current waveform to compensate for transition nonlinearities. In one exemplary embodiment, the control voltage is selected according to the criteria shown in Table 1 below:

TABLE 1

| $D_n$ | $D_{n-1}$ | $D_{n-2}$ | $V_{control}$ |
|---|---|---|---|
| 0 | X | X | 2.5 (nominal) |
| 1 | 0 | 0 | 2.0 |
| 1 | 1 | 0 | 3.0 |
| 1 | 1 | 1 | 1.0 |
| 1 | 0 | 1 | 4.0 |

As can been seen from FIG. 4 and Table 1, write current waveform modulation (via control voltage adjustment from a nominal value) occurs when a transition is to be recorded, with the amount of control voltage adjustment depending on whether the previous two data bits were transitions.

FIGS. 5–8 are graphs illustrating a simulation in which the control voltage was varied for particular transitions in the exemplary NRZI data pattern employed in FIG. 4. The simulation results shown in FIGS. 5–8 illustrate the effect that varying the control voltage has on the write current waveform.

Figure 5:
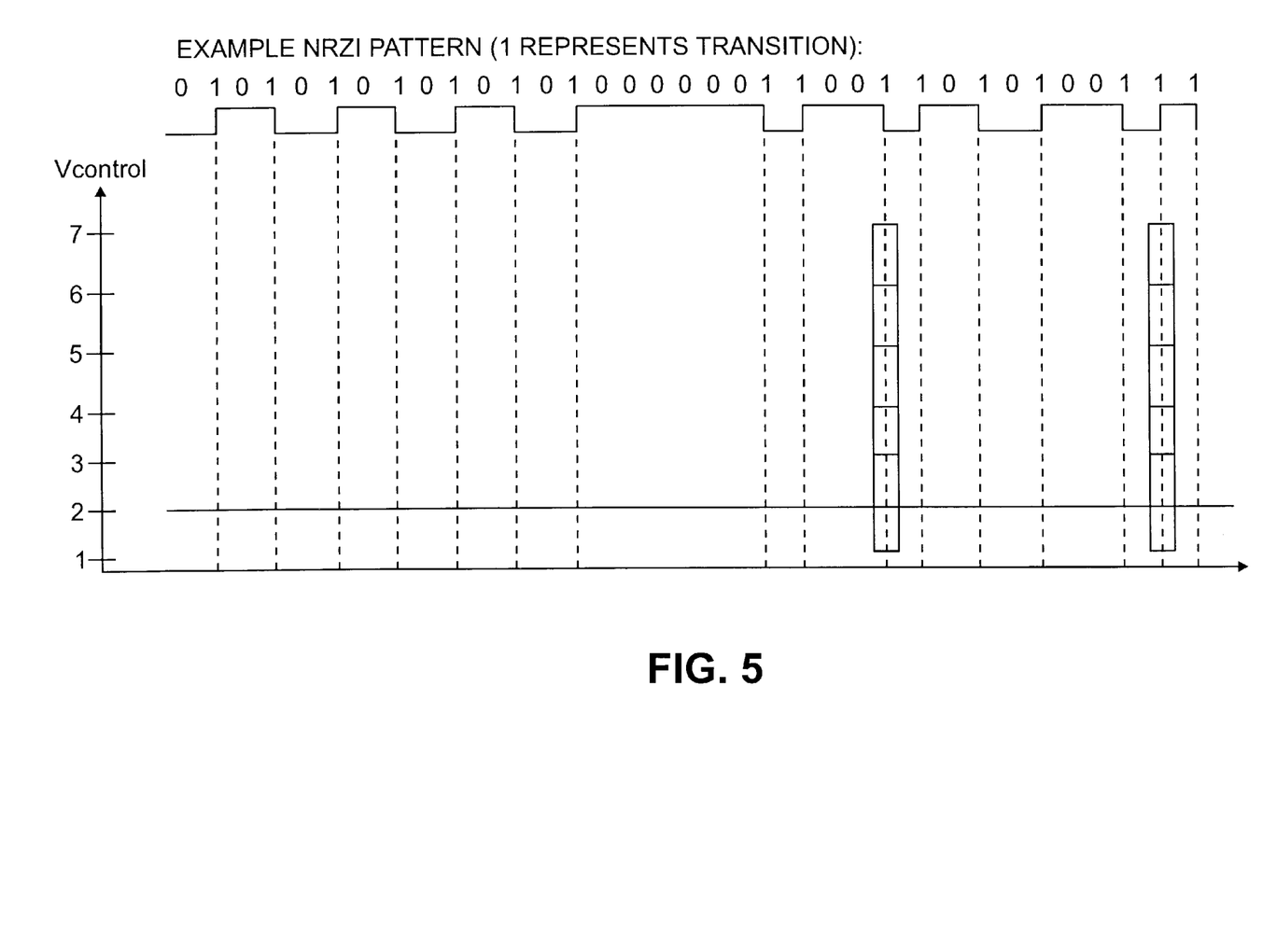
FIGS. 5–8 are graphs illustrating a simulation in which a control voltage was varied for particular transitions in the exemplary NRZI data pattern employed in FIG. 4, illustrating the effect that varying the control voltage has on the write current waveform.

FIG. 5 is a graph showing the values of the control voltage ($V_{control}$) for each of the bits of the exemplary NRZI data pattern The simulation was run to show the effect of varying the control voltage for a transition that will be followed by another transition (the 10th transition) and for a transition that was both preceded and followed by another transition (the 15th transition). Thus, the control voltage was kept at a constant value of 2.0 for all of the bits except for the 10th transition and the 15th transition, where control voltages of 0.0, 1.0, 2.0, 3.0, 4.0, 5.0, 6.0 and 7.0 were selected for the iterations of the simulation. In the case of the exemplary embodiment employed in the simulation, increasing the control voltage decreases the voltage available to the write driver, and decreasing the control voltage increases the voltage available to the write driver.

Figure 6:
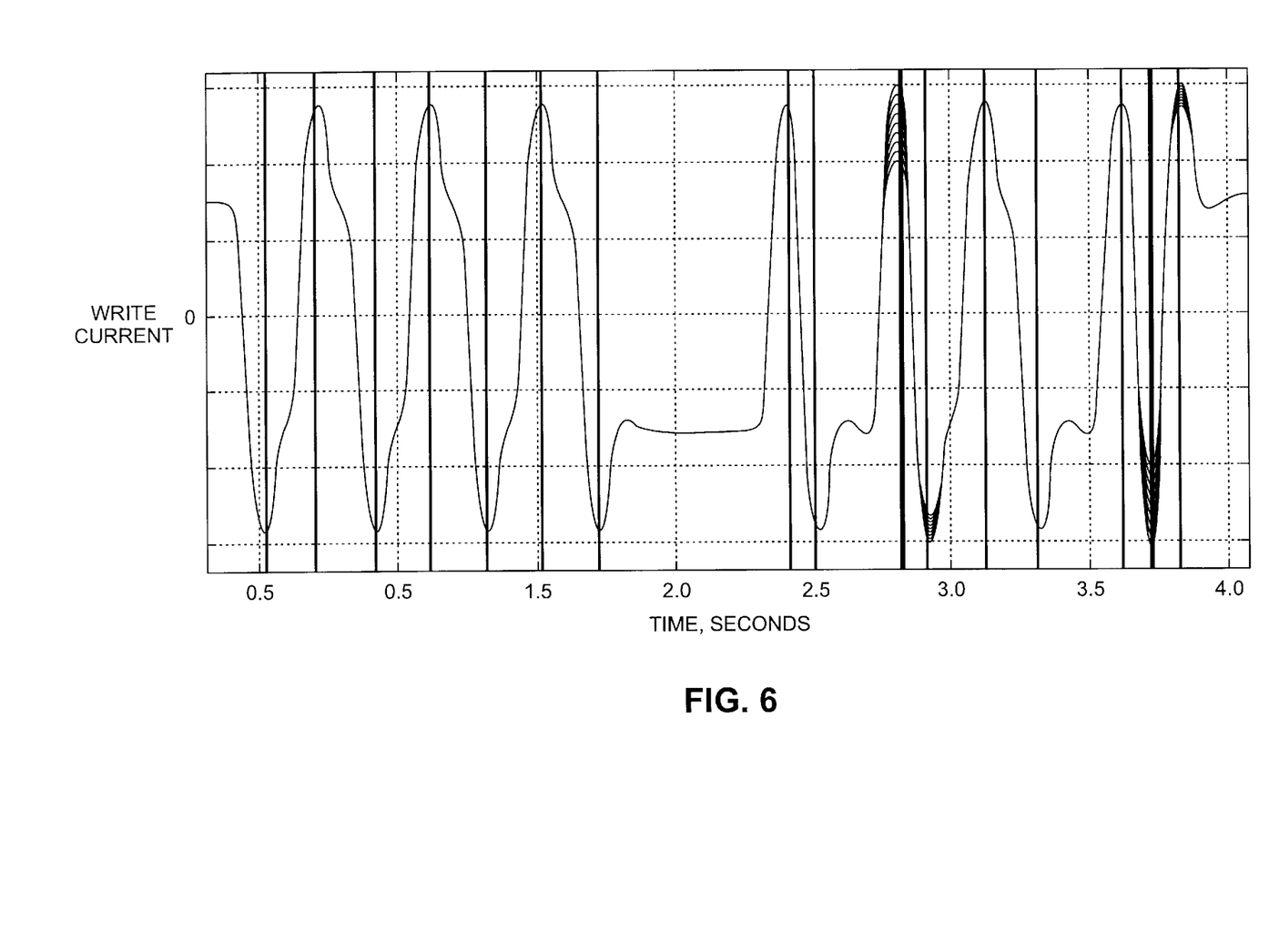

FIG. 6 is a graph showing the write current waveform generated by the write driver to record the exemplary NRZI data pattern. The graph also shows the timing of the actual recording of transitions. The write current waveform has a family of curves around the 10th and 15th transitions due to the multiple simulations performed with varying control voltages at those transitions, and the timing of the actual recording of the 10th and 15th transitions has a wider band due to the variation of the control voltages.

Figure 7:
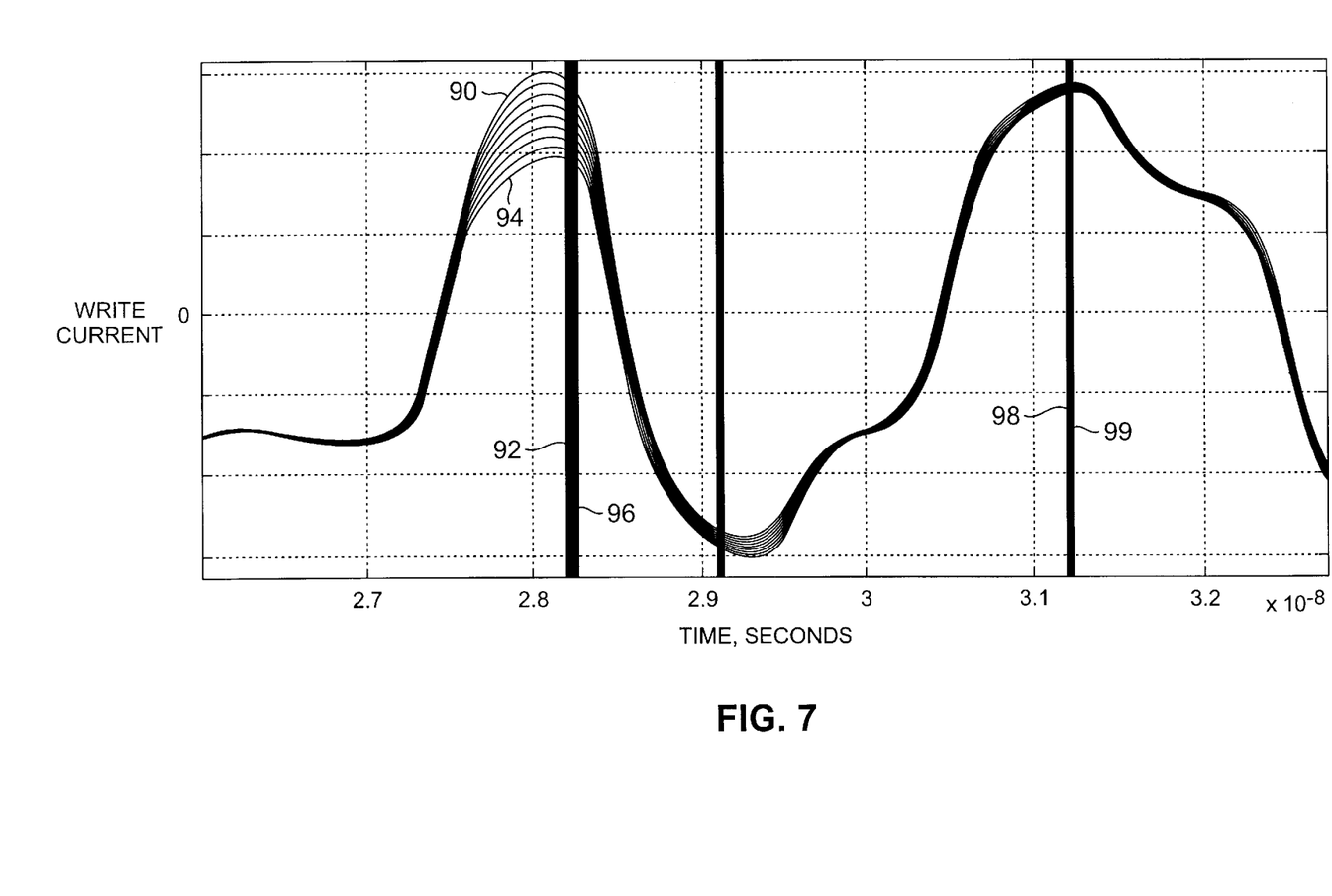

FIG. 7 is a graph showing the family of curves of the write current waveform around the 10th transition in more detail. Curve 90 has the highest peak value, and corresponds to a control voltage of 0.0 (giving the highest voltage available to the write driver). The magnetic transition is recorded at line 92 when the control voltage is 0.0, which is the earliest transition of the family of write current waveform curves. Curve 94 has the lowest peak value, and corresponds to a control voltage of 7.0 (giving the lowest voltage available to the write driver). The magnetic transition is recorded at line 96 when the control voltage is 7.0, which is the latest transition of the family of write current waveform curves. Thus, FIG. 7 illustrates that a higher voltage available to the write driver (resulting from a lower value of the control voltage in the exemplary embodiment shown) causes magnetic transitions to be recorded earlier in time, and a lower voltage available to the write driver (resulting from a higher value of the control voltage) causes magnetic transitions to be recorded later in time.

The 10th magnetic transition is immediately followed by another (the 11th) transition. As shown in FIG. 7, there is still a family of curves for the write current waveform at the 11th transition, as the write current waveform settles back to its nominal shape (with a nominal control voltage of 2.0). The timing of the 11th transition therefore also is written at a range of times, between lines 98 and 99, depending on the control voltage selected for the 10th transition. By the 12th transition, the timing of the transition is fairly consistent as the variations in the write current waveform have settled.

Figure 8:
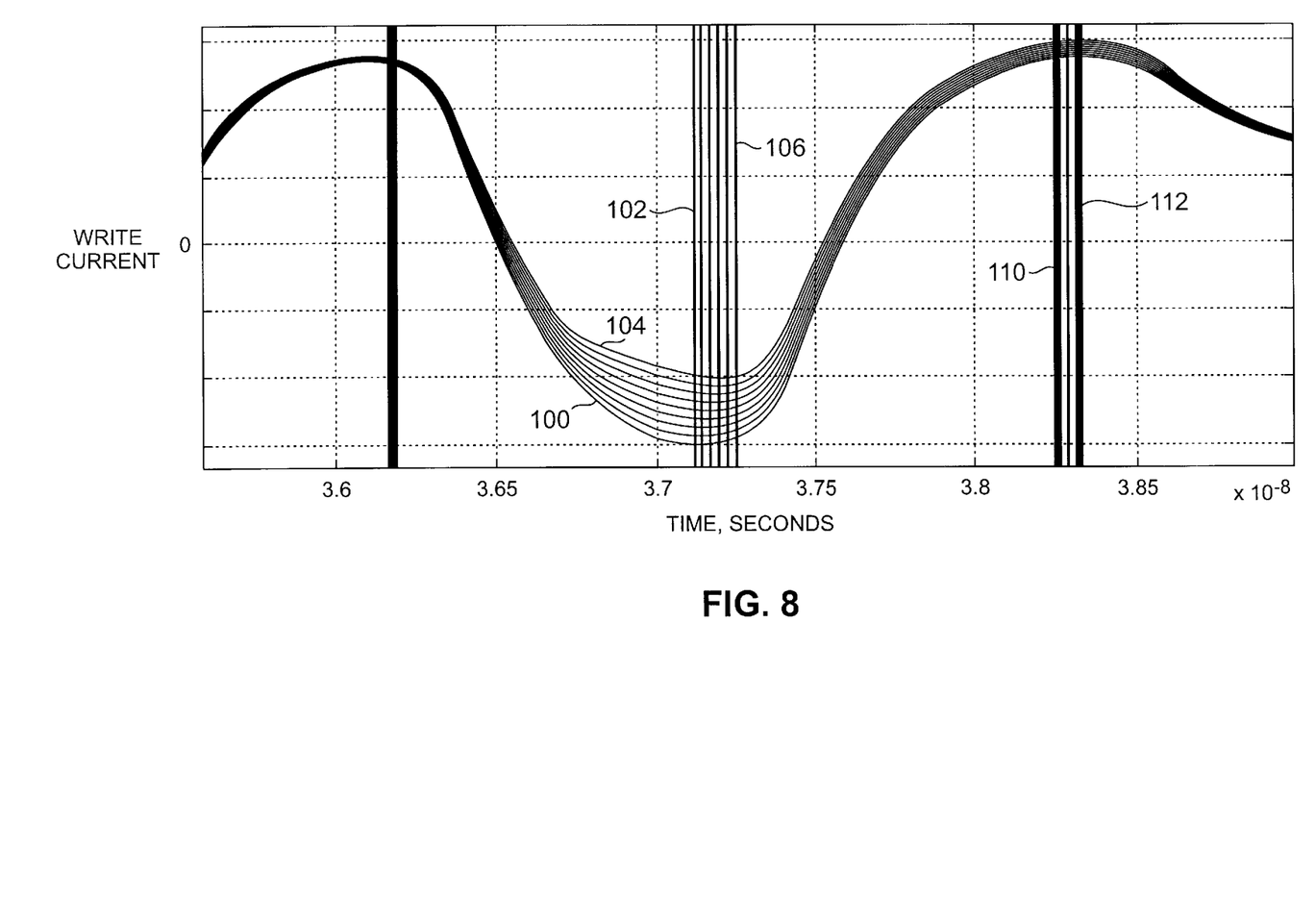

FIG. 8 is a graph showing the family of curves of the write current waveform around the 15th transition in more detail. Curve 100 has the largest (most negative) peak value, and corresponds to a control voltage of 0.0 (giving the highest voltage available to the write driver). The magnetic transition is recorded at line 102 when the control voltage is 0.0, which is the earliest transition of the family of write current waveform curves. Curve 104 has the smallest (least negative) peak value, and corresponds to a control voltage of 7.0 (giving the lowest voltage available to the write driver). The magnetic transition is recorded at line 104 when the control voltage is 7.0, which is the latest transition of the family of write current waveform curves. Thus, FIG. 8 (like FIG. 7) illustrates that a higher voltage available to the write driver (resulting from a lower value of the control voltage in the exemplary embodiment shown) causes magnetic transitions to be recorded earlier in time, and a lower voltage available to the write driver (resulting from a higher value of the control voltage) causes magnetic transitions to be recorded later in time.

The 15th magnetic transition is immediately followed by another (the 16th) transition. As shown in FIG. 8, there is still a family of curves for the write current waveform at the 16th transition, as the write current waveform settles back to its nominal shape (with a nominal control voltage of 2.0). The timing of the 16th transition therefore also is written at a range of times, between lines 110 and 112, depending on the control voltage selected for the 15th transition.

The foregoing explanation shows that the timing of magnetic transitions recorded by a write driver can be adjusted by modulating the write current waveform generated by the write driver, such as by controlling the voltage available to the write driver in an exemplary embodiment. The timing of magnetic transitions is adjusted according to the present invention by modulating the write current waveform in a manner that compensates for timing irregularities that occur due to particular data patterns. The values of data bits previously recorded and/or to be subsequently recorded are taken into account in modulating the write current waveform. As a result, the data rates achievable for a particular write driver are improved.

The circuit implementations of the present invention described above are intended to be exemplary in nature. It will be understood by those skilled in the art that other modified arrangements of known circuit elements may also be employed to achieve the timing adjustments of the present invention. Such arrangements are within the scope of the present invention.

Although the present invention has been described with reference to preferred embodiments, workers skilled in the art will recognize that changes may be made in form and detail without departing from the spirit and scope of the invention. Particularly, while some forms of the invention are described in the form of discrete devices, it is recognized that the circuit is preferably reduced to practice in the form of an integrated circuit (IC). Therefore, terms such as "device" and the like should be construed in their broadest contexts to include portions of ICs that are conveniently described as functional components, as well as discrete devices. Likewise, some forms of the invention are described in terms of logical gates and chips that could also be implemented by discrete devices, all within the scope and spirit of the present invention.

What is claimed is:

1. A method of magnetically recording a plurality of data bits on a medium, the method comprising:
   generating a write current waveform for direction through a write head in order to record the plurality of data bits on the medium; and
   adjusting a shape of the write current waveform by adjusting a peak value of the write current waveform following a polarity transition based on a pattern of the data bits recorded.

2. The method of claim 1, wherein the step of adjusting the shape of the write current waveform based on the pattern of data bits recorded comprises:
   determining a state of the current data bit being recorded on the medium;
   determining a state of at least one data bit previously recorded on the medium;
   adjusting the shape of the write current waveform based on the state of the current data bit being recorded on the medium and the state of the at least one data bit previously recorded on the medium.

3. The method of claim 2, wherein the step of generating the write current waveform is performed by a write driver circuit and the step of adjusting the shape of the write current waveform comprises adjusting a voltage available to the write driver circuit.

4. The method of claim 3, wherein the voltage available to the write driver circuit is adjusted when the state of the current data bit being recorded corresponds to a magnetic transition.

5. The method of claim 2, wherein the steps of determining the state of the current data bit being recorded on the medium and determining the state of at least one data bit previously recorded on the medium comprise:
   receiving a data input stream in a shift register comprising a plurality of shift register elements; and
   outputting the state of the current data bit being recorded on the medium and the at least one data bit previously recorded on the medium from the plurality of shift register elements.

6. The method of claim 5, further comprising delaying recording of the current data bit to account for latencies of the shift register elements.

7. The method of claim 2, further comprising:
   determining a state of at least one data bit to be subsequently recorded on the medium; and
   wherein the shape of the write current waveform is adjusted based on the state of the current data bit being recorded on the medium, the state of the at least one data bit previously recorded on the medium and the state of the at least one data bit to be subsequently recorded on the medium.

8. A write control circuit for magnetically recording a plurality of data bits on a medium, the circuit comprising:
   a write driver operable to generate a write current waveform for direction through a write head in order to record the plurality of data bits on the medium; and
   a voltage control circuit operatively coupled to the write driver to affect operation of the write driver to selectively adjust a shape of the write current waveform based on a pattern of the data bits recorded.

9. The write control circuit of claim 8, wherein the voltage control circuit comprises:
   multiplexing circuitry operable to adjust a voltage available to the write driver based on the pattern of data bits recorded.

10. The write control circuit of claim 9, wherein the multiplexing circuitry comprises:
    a first multiplexer for selecting a control voltage value based on the pattern of data bits recorded; and
    a second multiplexer for selecting between the control voltage value selected by the first multiplexer and a nominal voltage value based on a state of the current data bit being recorded, an output of the second multiplexer being connected to the write driver.

11. The write control circuit of claim 9, wherein the control voltage value is inversely proportional to the voltage available to the write driver.

12. The write control circuit of claim 9, wherein the voltage control circuit comprises:

shift register circuitry operatively coupled to the multiplexing circuitry for determining a state of the current data bit being recorded on the medium and a state of at least one data bit previously recorded on the medium.

13. The write control circuit of claim 12, wherein the multiplexing circuitry is operable to adjust the voltage available to the write driver when the state of the current data bit being recorded corresponds to a magnetic transition.

14. The write control circuit of claim 12, wherein the voltage control circuit comprises:

delay circuitry operatively coupled to the write driver circuit to account for latencies of the shift register circuitry.

15. The write control circuit of claim 8, wherein the write driver and the voltage control circuit are implemented in an integrated circuit (IC).

16. A method of magnetically recording data bits on a medium, the method comprising:

determining a state of the current data bit being recorded on the medium;

determining a state of at least one of a data bit previously recorded and a data bit subsequently recorded on the medium; and providing a write current waveform having a shape that is adjusted based on the state of the current data bit being recorded on the medium and the state of at least one of a data bit previously recorded and a data bit subsequently recorded on the medium.

17. The method of claim 16, wherein the step of providing a write current waveform is performed by a write driver circuit wherein the shape of the write current waveform is adjusted by selecting a voltage level to be made available to the write driver circuit.

18. The method of claim 17, wherein the step of selecting the voltage level to be made available to the write driver circuit is performed by a write control circuit multiplexing the state of the current data bit being recorded on the medium and the state of at least one of either a data bit previously recorded and a data bit subsequently recorded on the medium.

19. The method of claim 17, wherein the voltage level made available to the write driver circuit is adjusted when the state of the current data bit being recorded corresponds to a magnetic transition.

20. The method of claim 16, wherein the step of determining the state of at least one of a data bit previously recorded and a data bit subsequently recorded on the medium comprise:

receiving a data input stream in a shift register comprising a plurality of shift register elements; and outputting the state of the current data bit being recorded on the medium and the state of at least one of the data bit previously recorded and the data bit subsequently recorded on the medium from the plurality of shift register elements.

21. The method of claim 20, further comprising delaying recording of the current data bit to account for latencies of the shift register elements.

* * * * *